(12) United States Patent
Oota et al.

(10) Patent No.: US 6,471,528 B2
(45) Date of Patent: Oct. 29, 2002

(54) ROTARY CONNECTION DEVICE

(75) Inventors: Kouji Oota, Nagoya (JP); Tomoyuki Sakata, Nagoya (JP)

(73) Assignees: Autonetworks Technologies, Ltd., Nagoya (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/736,422

(22) Filed: Dec. 15, 2000

(65) Prior Publication Data

US 2001/0004560 A1 Jun. 21, 2001

(30) Foreign Application Priority Data

Dec. 20, 1999 (JP) ............................................ 11-360420

(51) Int. Cl.⁷ .............................................. H01R 35/04
(52) U.S. Cl. ....................................................... 439/164
(58) Field of Search ......................................... 439/164

(56) References Cited

U.S. PATENT DOCUMENTS 6,022,230 A * 2/2000 Matsumoto .................. 439/164
6,164,994 A * 12/2000 Bolen et al. ................. 439/164
6,196,488 B1 * 3/2001 Sakata et al. ............ 439/164 X

* cited by examiner

Primary Examiner—Renee Luebke
(74) Attorney, Agent, or Firm—Oliff & Berridge, PLC

(57) ABSTRACT

In a rotary connection device, since a film of a solid lubricant is coated on both sides or one side of the flat cable, only the film and the surface facing thereto, or the films slide with each other at the time of tightening or loosening the flat cable, and thus the sliding friction can be reduced at the time of rotational sliding.

6 Claims, 4 Drawing Sheets

FIG.1A   FIG.1B
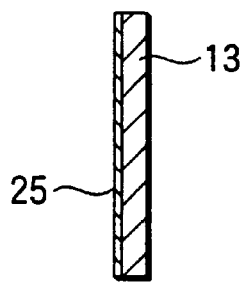 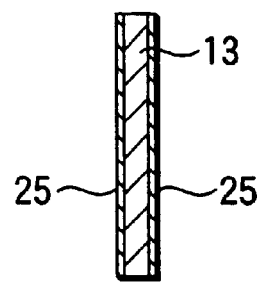
FIG.1C   FIG.1D
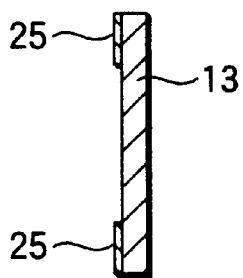 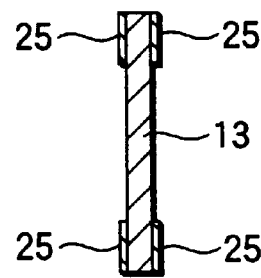
FIG.1E   FIG.1F
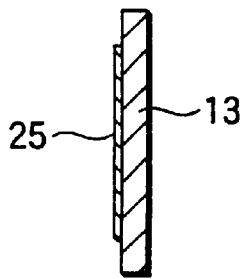 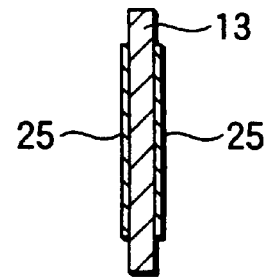

PRIOR ART

PRIOR ART

ROTARY CONNECTION DEVICE

BACKGROUND OF THE INVENTION

1. Field of the Invention

The present invention relates to a rotary connection device to be used for electric connection between parts relatively rotatable with each other in automobiles, domestic electric appliances, or the like.

2. Description of the Related Art

As shown in FIG. 4, a steering wheel mounting part of an automobile is provided with a steering shaft 2 supported rotatably in a bracket 1 fixed on the body, and a switching device 3 and a rotary connection device 4 above the bracket 1. A steering wheel 6 is mounted on the tip end part of the steering shaft 2 projecting upward through the switching device 3 and the rotary connection device 4 so as to be rotated integrally with the shaft 2. Moreover, electric equipment 7 such as a horn switch and an air bag can be mounted on the steering wheel 6, as needed. The switching device 3 is, for example, an assembly of switches for a turn signal lamp, a wiper, or the like, with operation levers 8, 9 mounted on the right and left side surfaces thereof for a changeover operation of the switches.

As shown in an exploded view of FIG. 6, the rotary connection device comprises a flat cable (flexible flat cable .... FFC) 13 stored in a spirally wound state in a ring-like space 12 formed between a fixed side case 10 to be fixed on the body side, and a rotary side rotor 11 to be rotated integrally with the steering wheel 6 such that a connector 15 mounted on the other side end part of the flat cable 13 via an end member 15' is connected with a connector 16 of the bracket 1 as well as a connector mounted on the inner side end part of the flat cable 13 via an end member 17' is connected with a connector 18 of the electric equipment 7. The numeral 19 denotes a cover, 20 a C ring (stopper ring) for fixing the rotor 11 rotatably on the case 10, and 21 a smoothing sheet.

As shown in FIG. 5, in the rotary connection device after assembly, the rotor 11 can be rotated with respect to the case 10, with the inner circumferential surface part of the center hole part 10a of the case 10 and the outer circumferential surface part of the center axis part 11a of the rotor 11 serving as the rotational sliding part.

According to rightward or leftward rotation of the rotor 11 following a rotating operation of the steering wheel rightward or leftward, the flat cable 13 can be tightened or loosened with respect to the rotor 11.

However, due to friction between the surfaces facing with each other, a "shoo, shoo" rotational sliding noise may be generated at the time of tightening or loosening the flat cable 13. In order to restrain such a rotational sliding noise, a flat cable 13 applied with a matte (like a satin finished surface having minute roughness) treatment on one surface for reducing the sliding friction has been proposed, however, it cannot restrain the rotational sliding noise satisfactorily.

SUMMARY OF THE INVENTION

The invention has been achieved for solving the conventional problem, and an object thereof is to provide a rotary connection device capable of effectively restraining the rotational sliding noise of a flat cable.

In order to solve the problems, the invention provides a rotary connection device comprising a fixed side case, a rotary side rotor rotatable in the case, and a flat cable stored in a spirally wound state in a ring-like space part formed between the case and the rotor, wherein a film of a solid lubricant is coated on both sides or one side of the flat cable.

According to the invention, since a film of a solid lubricant is coated on both sides or one side of the flat cable, only the film and the surface facing thereto, or the films slide with each other at the time of tightening or loosening the flat cable, and thus the sliding friction can be reduced drastically at the time of rotational sliding.

The film coating operation with the solid lubricant can be executed in either the flat cable operation or the flat cable assembly.

Moreover, the film of the solid lubricant is preferably a fluorine based film, but can be a molybdenum based film, or a silicon based film.

BRIEF DESCRIPTION OF THE DRAWINGS

FIG. 1A is a side cross-sectional view of a flat cable of the invention with the entirety of one side coated;

FIG. 1B is a side cross-sectional view thereof with the entirety of both sides coated;

FIG. 1C is a side cross-sectional view thereof with the upper and lower parts of one side coated;

FIG. 1D is a side cross-sectional view thereof with the upper and lower parts of both sides coated;

FIG. 1E is a side cross-sectional view thereof with the center part of one side coated; and FIG. 1F is a side cross-sectional view thereof with the center part of both sides coated;

DETAILED DESCRIPTION OF THE PREFERRED EMBODIMENTS

Hereinafter preferable embodiments of the invention will be explained with reference to drawings. The components of the same configurations and effects as in the prior art are applied with the same numerals and detailed explanation is not given.

FIG. 1A shows an embodiment with a film 25 of a solid lubricant coated on the entirety of one side of the flat cable (flexible flat cable .... FFC) 13. FIG. 1B shows an embodiment with the film 25 of the solid lubricant coated on the entirety of both sides of the flat cable 13.

The film of the solid lubricant is preferably a fluorine based film, but can be a molybdenum based film, or a silicon based film.

The film coating operation with the solid lubricant can be executed, for example, by applying a fluorine solution on both sides or one side of the flat cable 13, and drying. The coating operation can be performed during either production or assembly of the flat cable. Moreover, as to the coating thickness, several $\mu$m is adequate, and a slight thickness irregularity is negligible.

The film 25 of the solid lubricant can be coated on the upper and lower parts of one side of the flat cable 13 as shown in FIG. 1C, or the film 25 of the solid lubricant can be coated on the upper and lower parts of both sides of the flat cable 13 as shown in FIG. 1D.

Furthermore, the film 25 of the solid lubricant can be coated on the center part of one side of the flat cable 13 as shown in FIG. 1E, or the film 25 of the solid lubricant can be coated on the center part of both sides of the flat cable 13 as shown in FIG. 1F.

Figure 2:
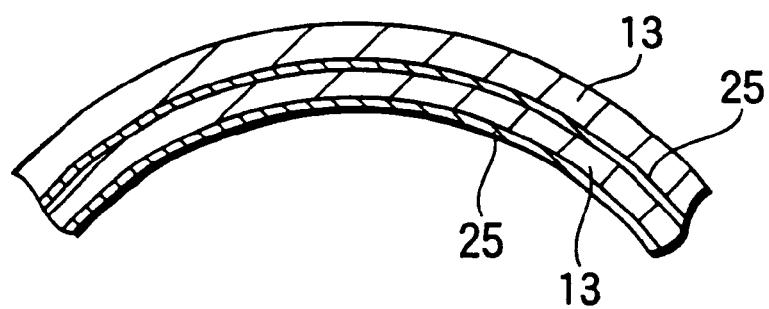
FIG. 2 is a principal part plan cross-sectional view of a flat cable with the entirety of one side coated, wound spirally.

According to the configurations, since the film 25 of the solid lubricant is coated on both sides or one side of the flat cable 13, only the film 25 and the surface facing thereto in the case of the one side coating as shown in FIG. 2, or the films 25 in the case of the both side coating slide with each other at the time of tightening or loosening the flat cable 13, and thus the sliding friction can be reduced drastically at the time of rotational sliding so as to effectively restrain the rotational sliding noise of the flat cable.

Figure 3:
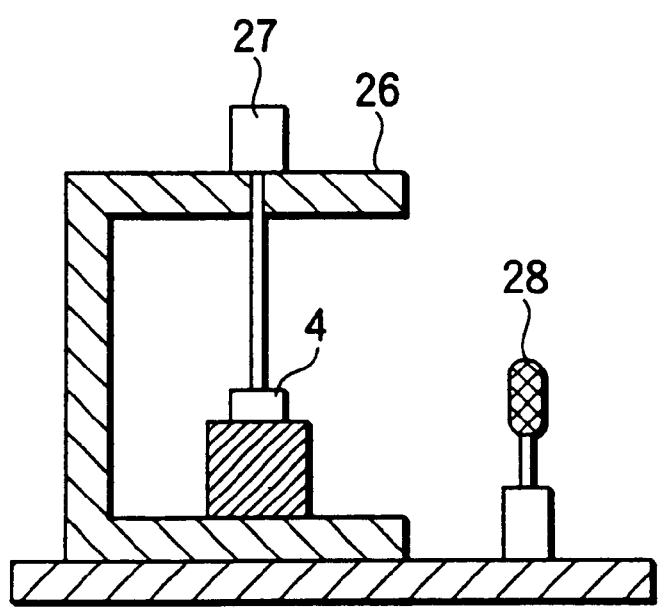
FIG. 3 is a side view of a measurement device for the rotational sliding noise.
Figure 4:
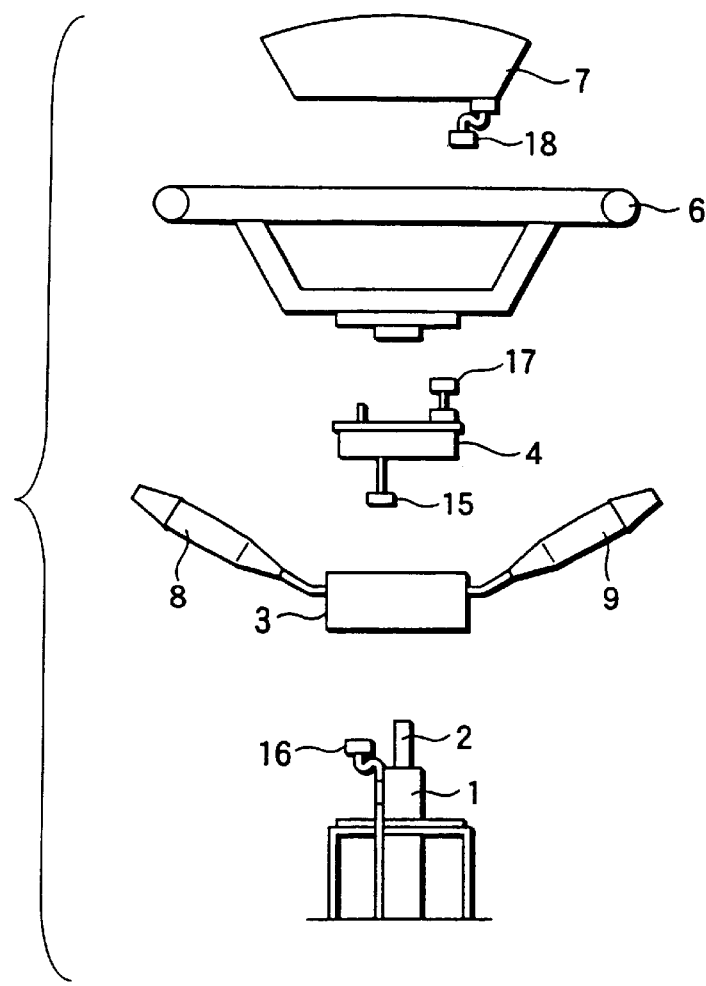
FIG. 4 is an exploded side view of a steering wheel mounting part of an automobile.
Figure 5:
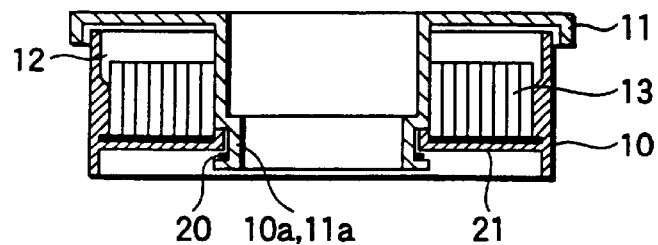
FIG. 5 is a side cross-sectional view of a rotary connection device of a prior art.
Figure 6:
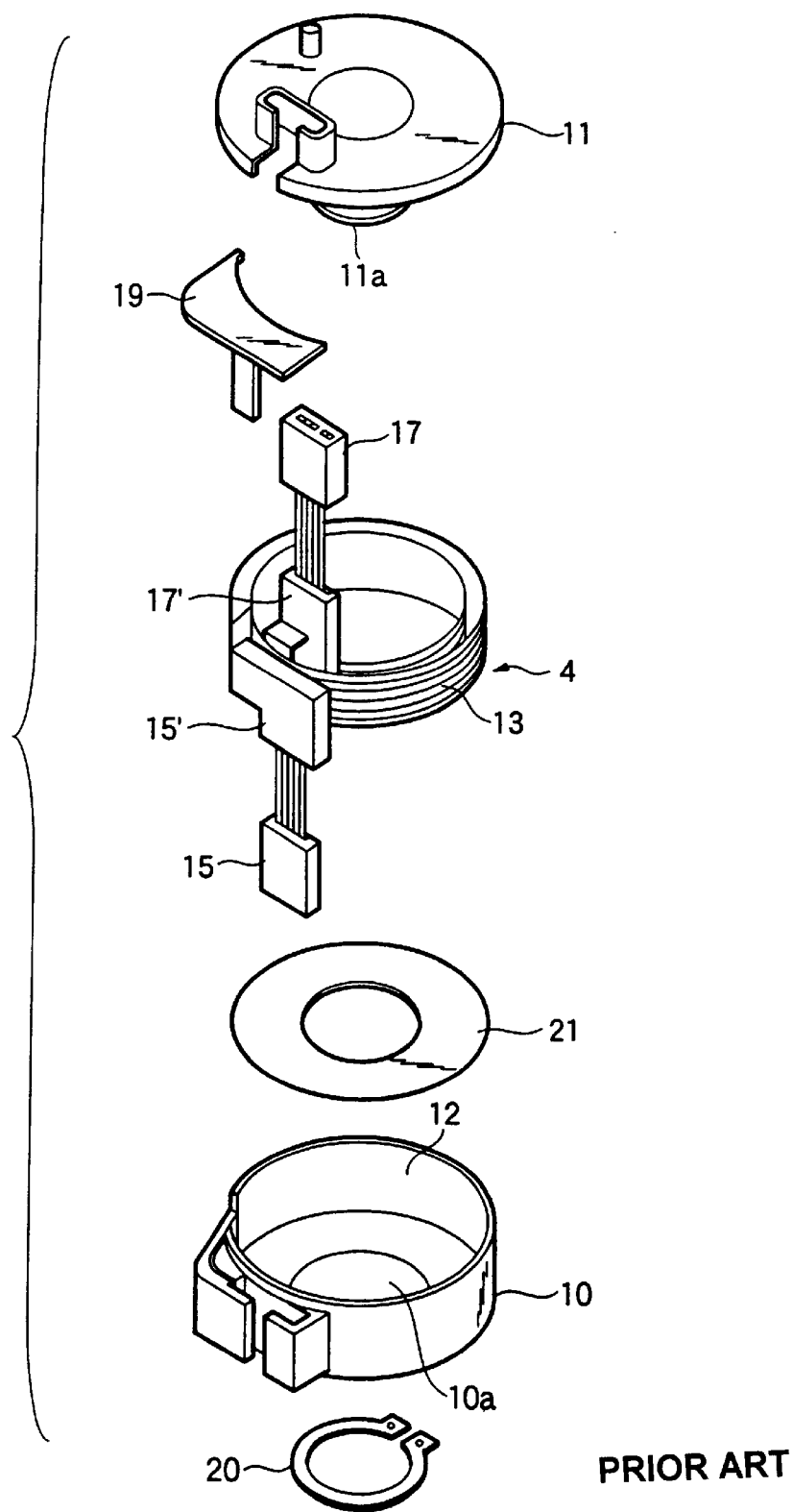
FIG. 6 is an exploded perspective view of the rotary connection device of the prior art.

A rotary connection device storing the conventional flat cable applied with the matte treatment, and a rotary connection device storing the flat cable of the invention with a film of a solid lubricant coated were placed in a sound proof chamber 26 as shown in FIG. 3 for measuring the rotational sliding noise of each of them, collected by a microphone 28 while being rotated by a motor 27 reciprocally. Results are as follows.

As to the conventional flat cable, the measured value is 36.8 dB in the rightward rotation (clockwise), and 35.6 dB in the leftward rotation (counterclockwise). In contrast, as to the flat cable of the invention, the measured value is 34.1 dB in the rightward rotation (clockwise), and 33.9 dB in the leftward (counterclockwise) rotation.

That is, it was found out that the rotational sliding noise can be reduced by as much as 2.7 dB in the right ward rotation, and 1.7 dB in the leftward rotation according to the flat cable of the invention.

As apparent from the explanation provided above, according to the invention, since a film of a solid lubricant is coated on both sides or one side of the flat cable, only the film and the surface facing thereto, or the films slide with each other at the time of tightening or loosening the flat cable, and thus the sliding friction can be reduced drastically at the time of rotational sliding so as to effectively restrain the rotational sliding noise of the flat cable.

What is claimed is:

1. A rotary connection device comprising:

a case;

a rotor rotatable in the case; and a flat cable stored in a spirally wound state in a space formed between the case and the rotor;

wherein a film of a solid lubricant is coated on both sides or one side of the flat cable.

2. The rotary connection device according to claim 1, wherein the film of the solid lubricant is any one selected from the group consisting of a fluorine based film, a molybdenum based film, and a silicon based film.

3. The rotary connection device according to claim 1, wherein the film of the solid lubricant is coated only on upper and lower parts of both sides or one side of the flat cable.

4. The rotary connection device according to claim 1, wherein the film of the solid lubricant is coated on a middle part of both sides or one side of the flat cable.

5. The rotary connection device according to claim 1, wherein the film of the solid lubricant is coated on an entirety of both sides or one side of the flat cable.

6. An automobile including the rotary connection device according to claim 1.

* * * * *